No. 668,426. Patented Feb. 19, 1901.
N. H. SUREN.
TESTING APPARATUS FOR ELECTRIC CIRCUITS.
(Application filed June 24, 1899.)

(No Model.)

Witnesses:
H. B. Davie.
J. L. Hutchinson.

Inventor:
Nathan H. Suren
by B. J. Noyes
Atty.

UNITED STATES PATENT OFFICE.

NATHAN H. SUREN, OF NEEDHAM, MASSACHUSETTS.

TESTING APPARATUS FOR ELECTRIC CIRCUITS.

SPECIFICATION forming part of Letters Patent No. 668,426, dated February 19, 1901.

Application filed June 24, 1899. Serial No. 721,699. (No model.)

*To all whom it may concern:*

Be it known that I, NATHAN H. SUREN, of Needham, county of Norfolk, and State of Massachusetts, have invented an Improvement in Testing Apparatus for Electric Circuits, of which the following description, in connection with the accompanying drawings, is a specification, like characters on the drawings representing like parts.

At the present time it is customary in many places to use storage batteries for fire-alarm and police signal systems, and such storage batteries are charged at the proper times by a current from a suitable charging-line. In such a storage-battery system it is important to know the voltage and amperage of the charging-current and also of the working or signaling circuit; and this invention has for its object to provide means whereby readings of both a voltmeter and an ampere-meter may be taken at the same time of either the charging-circuit or the working or signaling circuit without interrupting the continuity of either circuit and without in any other manner impairing the utility of the circuit for the purpose for which it is being used or intended to be used.

In accordance with this invention a "jack-hole" is provided in connection with each circuit, and a "jack-plug" is provided which is adapted to be introduced into either jack-hole at will, and wires are connected to the contact-plates of said jack-plug which are connected with and include both a voltmeter and an ampere-meter, and the jack-hole has contact-plates with which contact-plates on the jack-plug engage when said jack-plug is introduced. The electrical connections are such that when the jack-plug is introduced into either jack-hole the voltmeter will be connected in a closed shunt-circuit and the ampere-meter will be connected in series with the circuit to be tested, and as a consequence readings of both the voltmeter and ampere-meter may be taken at the same time.

Figure 1:
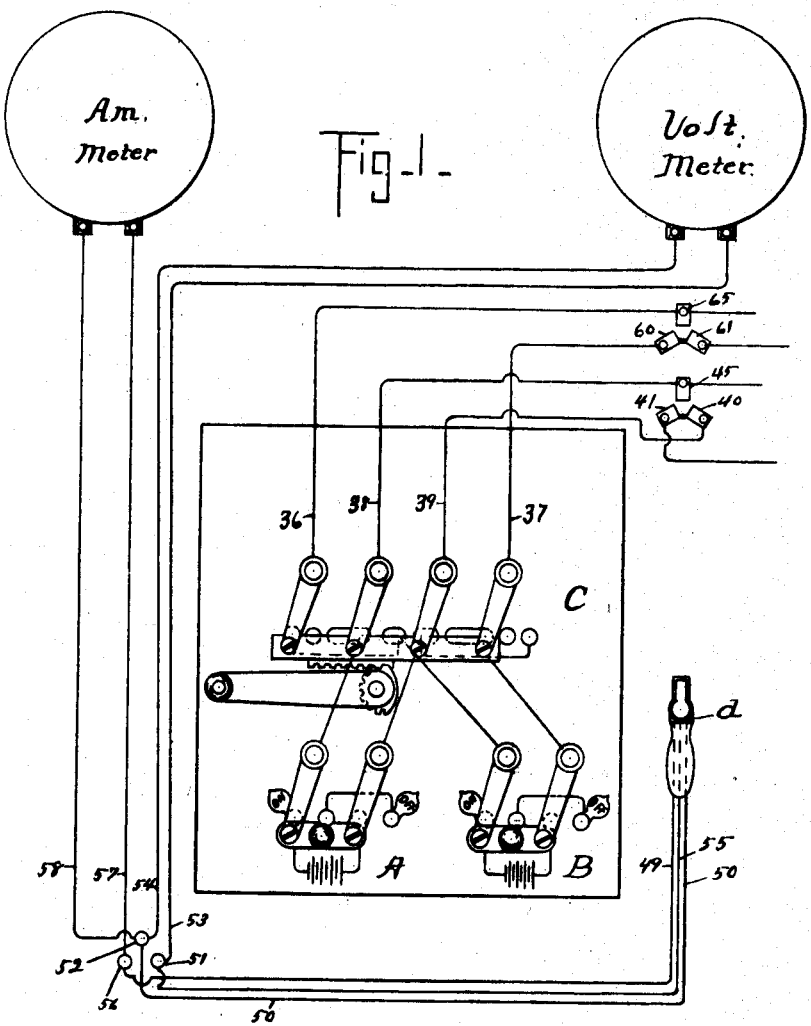
Figure 2:
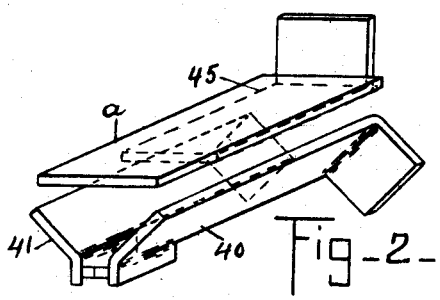
Figure 3:
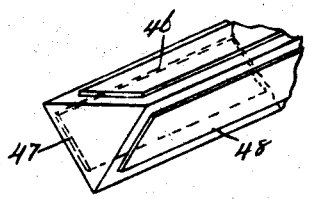

Figure 1 shows in front elevation a portion of a charging-circuit and working or signaling circuit and suitable switches for connecting a storage battery with said circuits and a voltmeter and an ampere-meter connected with a jack-plug which is adapted to be connected with either the charging-circuit or the working circuit at will. Fig. 2 is a perspective view showing the several contact-plates of the jack-hole. Fig. 3 is a perspective view of the acting end or portion of the jack-plug.

36 37 represent the wires of a charging-circuit, and 38 39 represent the wires of a working or signaling circuit.

A and B represent two storage batteries, one of which is adapted to be connected in the working or signaling circuit, while the other is connected in the charging-circuit, and C represents a gang-switch by means of which said connections may be made.

The working or signaling circuit wire 39 leads to a contact-plate 40, and a like contact-plate 41 normally bears upon said contact-plate 40, so as to normally maintain the continuity of the circuit. The working-circuit wire 38 leads to a contact-plate 45, which, as herein shown, is represented as a spring-acting plate located beneath and at the rear end of a guiding-plate *a*. The three contact-plates 40 41 45 are disposed relatively to each other in triangular form to present what is commonly called a "jack-hole." (See Fig. 2.) A similar triangular jack-hole is included in the charging-circuit wires 36 37, it consisting of the contact-plates 60 61 65, the latter being located beneath and at the rear end of a guiding-plate similar to the guiding-plate *a*. The contact-plates 60 and 61 are made spring-acting, like the contact-plates 40 and 41, and normally contact with each other, yet may be separated by the introduction of the jack-plug, as will be described. A jack-plug *d* is adapted to be introduced into either one of said jack-holes, as desired, and it has secured to it three contact-plates 46 47 48, arranged on the triangular-shaped end of the plug, so as to engage the contact-plates of either jack-hole. When the jack-plug is introduced, its contact-plate 46 will follow along beneath the guiding-plate *a* and will engage the contact-plate 45 or 65, and its contact-plates 47 and 48 will engage the contact-plates 40 41 or 60 61. The contact-plate 47 of the jack-plug is connected by a wire 49 with a terminal 56, and a wire 57 leads from said terminal 56 to one terminal of the ampere-meter, and a wire 58 leads from the other terminal of said ampere-meter to the terminal 52, and a wire 50 leads from said terminal 52 to the contact-plate 48, on the jack-plug, and whenever said jack-plug is introduced into either one of the jack-holes and its contact-plates 47 48 engage the two contact-plates which are normally held pressed together, it will be seen that said contact-plates which are normally held pressed together will be separated, and the ampere-meter will be connected in series with the circuit. The contact-plate 46 is connected by a wire 55 with the terminal 51, and a wire 53 leads from said terminal 51 to one terminal of the voltmeter, and a wire 54 leads from the other terminal of said voltmeter to the terminal 52, so that it will be seen that the voltmeter is included in a shunt-circuit across the battery, and whenever the jack-plug is introduced into one of the jack-holes its contact-plate 46 will engage the contact-plate 45 or 65 and close said shunt-circuit. It will thus be seen that the jack-plug may be readily introduced into either jack-hole to test either the charging-circuit or the working circuit and when introduced both the voltmeter and ampere-meter will be at the same time included, so that readings may be taken from both meters.

I prefer to use the plates $a$ solely as guiding-plates for the jack-plug, particularly in connection with the charging-circuit, so as to prevent short-circuiting the charging-circuit or the battery by carelessly introducing the jack-plug or by any conductor connecting the two plates, or as would be the case if said plate were connected with the line and adapted to serve as a contact-plate, yet I desire it to be understood that such guiding-plate may be omitted or it may serve as the contact-plate.

I claim—

1. The combination with an electric circuit, of a "jack-hole" having one of its contact-plates connected in one side of the line, and having two contact-plates connected in the other side of the line normally held in engagement with each other, a "jack-plug" having three contact-plates adapted to engage the aforesaid contact-plates and also to separate the two contact-plates which are normally held in engagement, and a voltmeter and an ampere-meter connected with the contact-plates on the "jack-plug," substantially as described.

2. The combination with an electric circuit, of a "jack-hole" having a guiding-plate and having one of its contact-plates connected in one side of the line and having two contact-plates connected in the other side of the line normally held in engagement with each other, a "jack-plug" having three contact-plates adapted to engage the aforesaid contact-plates and to separate the two contact-plates which are normally held in engagement, and a voltmeter and an ampere-meter connected with the contact-plates on said "jack-plug," substantially as described.

3. In a storage-battery signaling system, a working circuit and a charging-circuit, means for connecting a storage battery with either one of said circuits, a "jack-hole" included in each circuit, a jack-plug adapted to be introduced into either one of said "jack-holes," a voltmeter and an ampere-meter connected with said "jack-plug," substantially as described.

4. In a storage-battery signaling system, a working circuit, and a charging-circuit, means for connecting a storage battery with either one of said circuits, a "jack-hole" included in each circuit and a "jack-plug" adapted to be introduced into either one of said "jack-holes," a voltmeter connected with said "jack-plug," and adapted to be connected in shunt to the line across the battery, and an ampere-meter also connected to said "jack-plug," and adapted to be connected in series with the line, substantially as described.

In testimony whereof I have signed my name to this specification in the presence of two subscribing witnesses.

NATHAN H. SUREN.

Witnesses:
B. J. NOYES,
J. L. HUTCHINSON.